United States Patent
Van Rijnsoever et al.

(10) Patent No.: US 7,403,618 B2
(45) Date of Patent: Jul. 22, 2008

(54) CONDITIONAL ACCESS

(75) Inventors: Bartholomeus Johannes Van Rijnsoever, Eindhoven (NL); Johan Cornelis Talstra, Eindhoven (NL); Antonius Adriaan Maria Staring, Eindhoven (NL)

(73) Assignee: Irdeto Eindhoven B.V., Eindhoven (NL)

( * ) Notice: Subject to any disclaimer, the term of this patent is extended or adjusted under 35 U.S.C. 154(b) by 834 days.

(21) Appl. No.: 10/024,739

(22) Filed: Dec. 19, 2001

(65) Prior Publication Data

US 2002/0090090 A1 Jul. 11, 2002

(30) Foreign Application Priority Data

Dec. 22, 2000 (EP) ................... 00204798

(51) Int. Cl.
H04N 9/67 (2006.01)
H04N 7/16 (2006.01)
H04N 5/275 (2006.01)

(52) U.S. Cl. .............. 380/239; 380/241; 380/242

(58) Field of Classification Search .......... 380/239–242
See application file for complete search history.

(56) References Cited

U.S. PATENT DOCUMENTS

| | | | |
|---|---|---|---|
| 5,592,552 A | | 1/1997 | Flat |
| 5,712,800 A | * | 1/1998 | Aucsmith .................. 380/277 |
| 5,999,623 A | * | 12/1999 | Bowman et al. .......... 380/239 |
| 6,026,165 A | * | 2/2000 | Marino et al. ............. 380/273 |
| 6,118,873 A | * | 9/2000 | Lotspiech et al. ......... 380/277 |
| 6,167,137 A | * | 12/2000 | Marino et al. ............. 380/255 |
| 6,263,435 B1 | | 7/2001 | Dondeti et al. |
| 6,542,610 B2 | * | 4/2003 | Traw et al. ................ 380/262 |

(Continued)

FOREIGN PATENT DOCUMENTS

EP 0641103 A 3/1995

(Continued)

OTHER PUBLICATIONS

D.H. Wallner, E.J. Harder, R.C. Agee, "Key Management for Multicast: Issues and Architectures", Request for Comments 2627, Jun. 1999.

(Continued)

*Primary Examiner*—Gilberto Barron, Jr.
*Assistant Examiner*—Venkat Perungavoor
(74) *Attorney, Agent, or Firm*—Schwegman, Lundberg & Wossner, P.A.

(57) ABSTRACT

A transmitter provides receivers conditional access to data transmitted via a network. A content encryptor is used to encrypt the data under control of a same authorization key before it is transmitted to all receivers. The transmitter has a storage with a plurality of device keys. A further encryptor is used for producing a key block with a plurality of entries, where each entry is associated with a respective one of the device keys. At least some of the entries contain a representation of the authorization key encrypted with the associated device key. The transmitter transmits the same key block to all receivers.

The receiver has a subset of the device keys. A first decryptor is used to retrieve the authorization key by decrypting at least one entry of the key block that is associated with one of the device keys of the receiver. A second decryptor is used for decrypting the data under control of the authorization key.

21 Claims, 3 Drawing Sheets

U.S. PATENT DOCUMENTS

| | | | |
|---|---|---|---|
| 6,609,116 B1 * | 8/2003 | Lotspiech | 705/57 |
| 6,650,753 B1 | 11/2003 | Lotspiech et al. | |
| 6,880,081 B1 | 4/2005 | Itkis | |
| 2003/0194091 A1 | 10/2003 | Wajs | |

FOREIGN PATENT DOCUMENTS

| | | |
|---|---|---|
| WO | WO-0130018 | 4/2001 |

OTHER PUBLICATIONS

C.K. Wong, M. Gouda, S. Lam, "Secure Group Communications Using Key Graphs", Proceedings SIG-COMM 1998, ACM Press, NY, pp. 68-79, IEEE/ACM Transactions on Networking, vol. 8, No. 1, Feb. 2000, pp. 16-30.

"International Search Report for Application No. PCT/EP 00/09866", (May 1, 2001), 3 pgs.

Blundo, C, et al., "Trade-offs between communication and storage in unconditionally secure schemes for broadcast encryption and interactive key distribution", *Advances in cryptology—crypto '96. 16th annual international cryptology conference*, XP000626596 German ISBN: 3-540-61512-1, p. 389, (Aug. 18-22, 1996), 387-400.

Nakamura, H, et al., "Hierarchical group oriented key management method HGK", *Proceedings of the Sixth Annual Computer Security Applications Conference, IEEE*, (1990), 44-49.

Shiuh-Jeng Wang, et al., "A hierarchical and dynamic group-oriented cryptographic scheme", *IEICE Transactions on Fundamentals of Electronics, Communications and Computer Sciences, Institute of Electronic Information and Communication*, ENG, Japan, vol. E79-A, No. 1, p. 78, column 2—p. 79, column 1; figure 2, (Jan. 1996), 76-85.

"U.S. Appl. No. 10/124,287 Final Office Action mailed Jun. 7, 2006", 15 pgs.

"U.S. Appl. No. 10/124,287 Non Final Office Action mailed Nov. 30, 2005", 13 pgs.

"U.S. Appl. No. 10/124,287 Response filed Feb. 28, 2006 to Non Final Office Action mailed Nov. 30, 2005", 14 pgs.

* cited by examiner

CONDITIONAL ACCESS

FIELD OF INVENTION

The invention relates to a transmission system for providing conditional access to transmitted data; the system including a transmitter and a plurality of receivers coupled via a network. The invention also relates to a transmitter and to a receiver for use in such a system.

BACKGROUND OF INVENTION

In a conventional conditional access system, data is transmitted by a transmitter to a plurality of receivers. The transmission can occur in many forms, for instance using terrestrial, satellite, or cable transmission. Usually, data is broadcast (i.e. the data is transmitted once for receipt by all eligible receivers). Access to the data is conditional, for instance depending on whether or not a subscription fee has been paid for a specific receiver. Such conditional access to the data services is realized by encrypting the data (usually the encryption occurs in the transmitter) under control of an authorization key and by transmitting the encrypted data to the receivers. Furthermore, the decryption keys necessary for the decryption of the data are encrypted themselves and transmitted to the receivers. Usually, symmetrical encryption techniques are used, where the encryption and decryption keys are the same. Only those receivers that are entitled to the data are able to decrypt the decryption key using a first decryptor. The receivers can then decrypt the data using a second decryptor for decrypting the data under control of the authorization key. Normally the encryption/decryption of the authorization key occurs in a secure environment. To this end, these functions are usually executed on a smart-card in or connected to the receiver. In the system describe above, the authorization key is used to directly control the encryption/decryption of the data stream.

It is also known from prior art systems to add one or more security layers to ensure that a malicious user does not retrieve the authorization key sent from the second decryptor to the first decryptor and supplies the key to data decryptors of other receivers. In such systems, the key used for encrypting/decrypting the data is changed frequently (e.g. once every second). This key is usually referred to as the content key. The content key itself is also transmitted (usually broadcast) to all receivers in an encrypted form (referred to as control word), using the authorization key. In this scenario, the authorization key directly controls the decryption of the control word, and indirectly the decryption of the data. The decryption of the control word also takes place in the secure module of the receiver.

It will be appreciated that it is important that the authorization can not easily be retrieved by malicious users. To that end, each receiver is equipped with a fixed device key incorporated in the secure module. The transmitter encrypts the authorization key separately for each receiver under control of the unique fixed key associated with the receiver. The transmitter sends the encrypted authorization key separately to each receiver. This requires a lot of messages and a high bandwidth in the system. This implies that the authorization key is only exceptionally updated, e.g. once a year. If an authorization key has been illegally retrieved, this usually does not result in updating the authorization key as long as the number of receivers illegally using the broken key is relatively low.

SUMMARY OF INVENTION

It is an object of the invention to provide a conditional access system of the kind set forth which provides improved security and is more flexible in updating authorization keys.

The object of the invention is achieved in that the transmitter includes means for transmitting to all receivers same data encrypted under control of a same authorization key; and to all receivers a same key block with a plurality of entries, where each entry is associated with a respective different device key, at least some of the entries containing a representation of the authorization key encrypted with the associated device key; and in that the receiver is associated with a set of a plurality of device keys; the receiver including means for receiving the key block and the encrypted data; a first decryptor for retrieving the authorization key by decrypting at least one entry of the key block that is associated with one of the set of device keys associated with the receiver; and a second decryptor for decrypting the data under control of the authorization key.

According to the invention a set of unique device keys is used, where each of the device keys is used to produce a device key-specific representation of the authorization key, creating a set of representations of the authorization key. This set is referred to as the key block. Each entry of the key block may simply contain the outcome of encrypting the authorization key under control of a corresponding one of the device keys. It will be appreciated that the representation of the authorization key may be more complex, for instance using additional processing steps, like further encryption steps involving other keys. Each receiver is associated with a subset of the device keys. By taking one of the keys from its subset and decrypting the corresponding entry in the key block, the receiver obtains the authorization key. Preferably, the receiver knows for each of the keys in its set of device keys to which entry in the key block it corresponds. This knowledge may be pre-programmed, for instance in the form of a pointer. The subset associated with a receiver includes at least two device keys of the entire set. Sharing device keys between receivers results in that the number of device keys used in the system can be substantially smaller than the number of receivers in the system. Consequently, the key block can also be relatively small. A change of authorization key is effected by transmitting the key block to all devices. By sharing individual device keys, the amount of data to be transmitted as a result of the change is also relatively small compared to the authorization data transmitted in the known system to all individual receivers in combination. Moreover, the key block can be broadcast, whereas in the original system separate messages were used addressed to the individual receivers. Broadcasting significantly reduces the overhead. Particularly, by using a high degree of key sharing the key block can be kept small, allowing for a more frequent update of the authorization key, and as such increasing security of the system. It will be appreciated that the authorization key may directly or indirectly (via additional security layers) control the data encryption/decryption. In general, in the remainder control can be direct or indirect, unless explicitly indicated.

According to the measure of the dependent claim 2, the device keys are shared but the subset of device keys which are associated with a particular one of the receivers is unique for that receiver. For instance, in a system with four unique device keys, numbered 1 to 4, and wherein each device is associated with a subset of two device keys, a total of six devices can be distinguished in this way (being associated with the respective subsets of devices keys (1, 2), (1, 3), (1, 4), (2, 3), (2, 4), and (3, 4)). This enables device specific conditional access. It will be appreciated that in a typical conditional access system there may be several million receivers, where for instance a total of $2^{16}$ unique device keys may be used and each device is associated with a subset of 16 device keys.

According to the measure of the dependent claim 3, revocation of a receiver (i.e. disabling processing of the data by not providing access to the data decryption key) takes place by changing the authorization key and ensuring that the new key block does not contain a valid representation of the authorization key for those entries corresponding the device keys of the device to be revoked. In the example given above, the receiver associated with subset (1, 2) can be revoked by ensuring that the entries in the key block for keys 1 and 2 contain no valid encryption of the authorization key. This does imply that the receivers associated with the subsets (1, 3), (1, 4), (2, 3), and (2, 4) have lost one of the two device keys, but can still operate using the remaining key. In a typical, much larger, system many devices can be revoked without inadvertently revoking a valid receiver.

According to the measure of the dependent claim 4, a revoked receiver can be re-enabled. This is achieved by inserting at least one validly encrypted representation of the authorization key in an entry of the key block corresponding to a device key of a receiver to be re-enabled. Since, the system according to the invention enables a quick change of authorization key, this also makes it possibly to temporarily revoke one or more receivers. This enables supplying services to individual receivers or, since keys are shared, to groups of receivers. In a preferred embodiment, the entire set of keys is subdivided into at least two service-specific set of keys. If a device has subscribed to a specific one of the services, it will be supplied with at least one of the device keys from the corresponding set of keys. For instance, the entire set of keys can be divided into a 'day-time' and a 'late-night-time' sets of keys. For the standard subscription, each receiver is supplied with 8 keys from the day-time watching set. For the premium subscription, a receiver receives 8 additional keys from the late-night watching set. For instance, at 01.00 'o clock a new key block is made active with only valid entries for device keys from the late-night watching set. At 06.00 'o clock a new key block is made active with only or also valid entries for device keys from the day-time watching set.

According to the measure of the dependent claim 5, each receiver is also associated with a fixed device key (for instance incorporated in a smart card). This fixed device key is used to securely update the set of device keys associated with the receiver. The principle of sharing of device keys could result in a valid receiver being revoked as a side-effect of all of its device keys being revoked as a consequence of being used by malicious (and consequently revoked) receivers. To overcome this, such a device can be supplied with a new set of device keys. A new set can also be supplied if the user changes subscription and as such requires a new set of keys.

These and other aspects of the invention will be elucidated with reference to the drawings.

DETAILED DESCRIPTION

Figure 1:
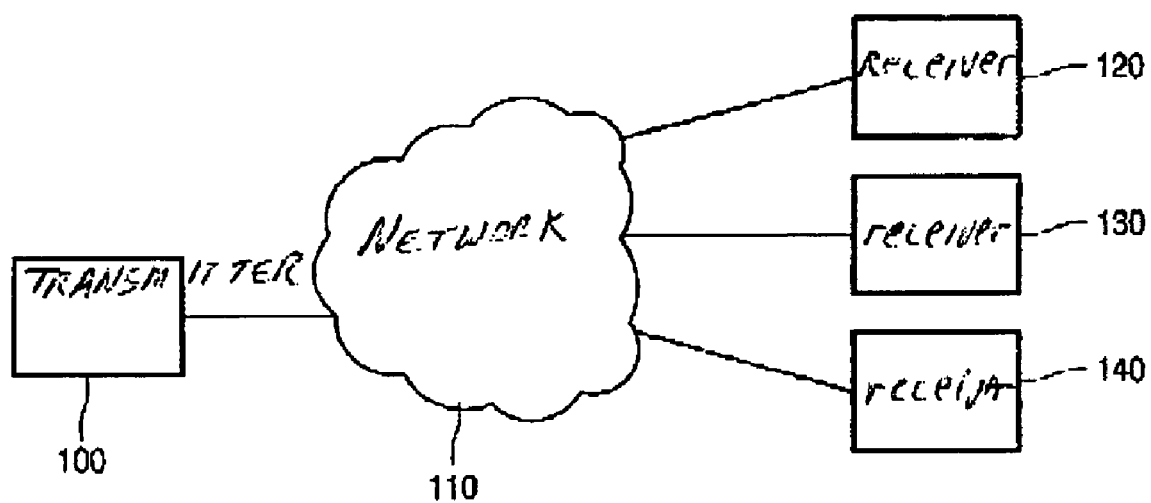
FIG. 1 shows an overview of the system according to the invention.

FIG. 1 shows an overview of the system according to the invention. The system includes a transmitter 100 connected via a communication network 110 to a plurality of receivers 120, 130, and 140. In such a transmission system a number of data signals or compound signals are transmitted by the transmitter 100 to the receivers. Typically the system includes many receivers. The receiver may be a separate device or incorporated in another suitable device, like a set top box, television, or PC. An end-user is usually able to control a receiver by means of an input device, like for instance a keyboard or a remote control. Data coming out of the receiver can be rendered immediately, for instance be shown on a display device or reproduced using an audio amplifier (or processed further or stored for later use). Data may be supplied from the transmitter to the receivers via broadcasting, like terrestrial, satellite, or cable broadcasting. A mixture of those techniques may also be used. The communication protocols may be based on Internet protocols. The transmission itself is not part of the invention and will not be described in detail.

Figure 2:
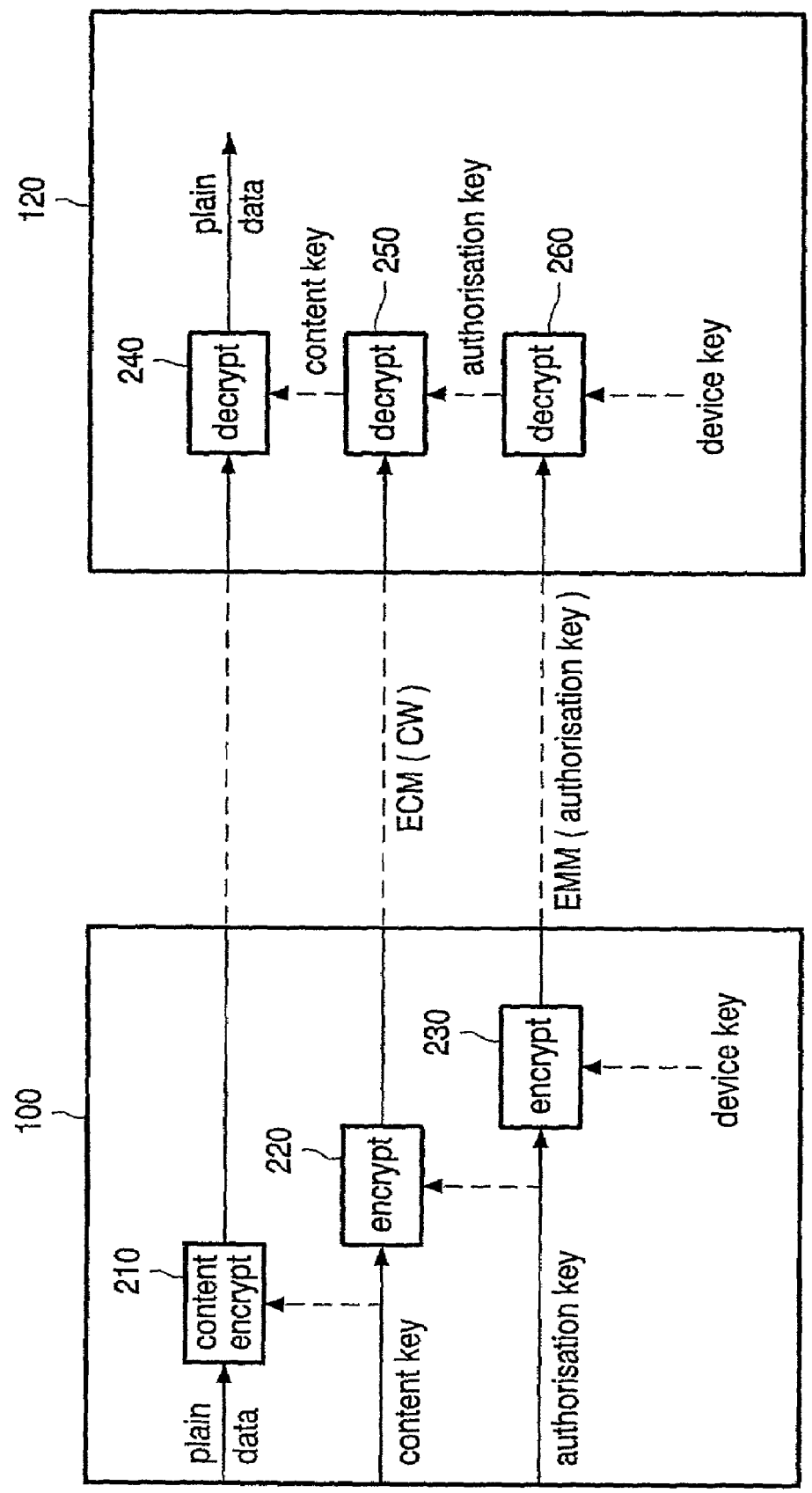
FIG. 2 shows a block diagram of a prior art conditional access system.
Figure 3:
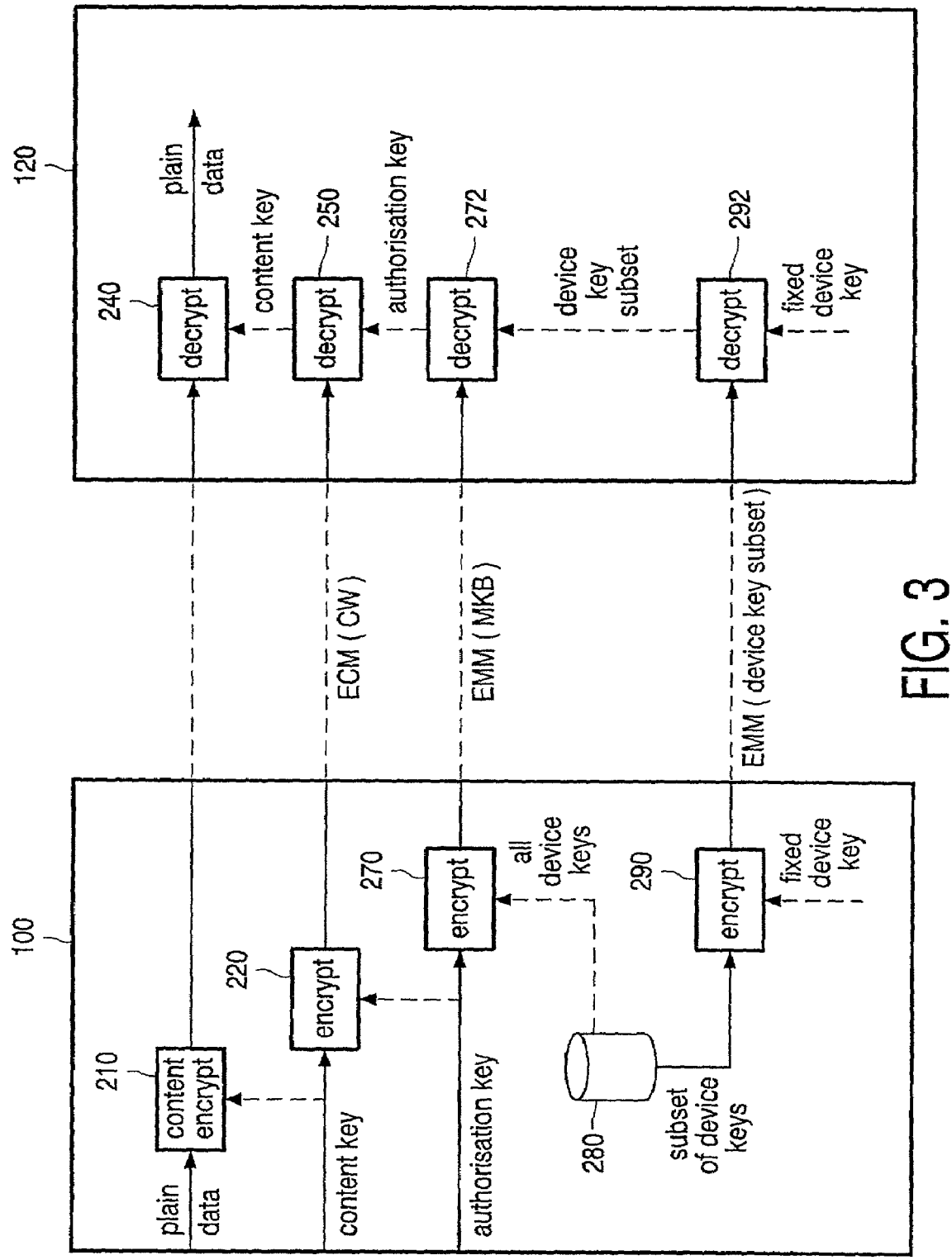
FIG. 3, shows a block diagram of the conditional access systems according to the invention.

In such a transmission system it may be desirable that only a limited number of the users of the receivers, e.g. only those who have paid or who belong to a certain group, have access to some or all data services. Such conditional access to the data services is realized by encrypting the data and by letting the transmitter 100 transmit the encrypted data to the receivers. Usually, the data is encrypted by the transmitter 100 using a content encryptor 210, as shown in FIG. 2 illustrating the prior art system and as shown in FIG. 3, illustrating the system according to the invention. If desired, also encrypted data may be supplied to the transmitter. The data is encrypted under direct control of a content key. In a typical system, the content key changes frequently, e.g. once every second. The content key is supplied by the transmitter to the receivers in an encrypted form, encrypted under control of an authorization key. To this end, the transmitter contains an encryptor 220 to encrypt the content key. The encrypted content key is referred to as control word (CW). The control word is usually transmitted in a so-called Entitlement Control Message or ECM. Such an ECM may be embedded in an IP packet or an MPEG transport stream. The same ECM is sent (broadcast) to all receivers. The receiver includes a decryptor 250 for decrypting the encrypted control word and the receiver retrieves the content key. The receiver uses the content key for controlling decryption of the encrypted data as performed by the decryptor 240. For the purpose of security, the control word changes often, e.g. after a certain period of time or after the transmission of a certain amount of data. A new ECM has to be transferred to the receiver, each time the control word value has changed. So with each conditionally accessible data service a stream of ECMs is associated. It may be required to retransmit an unchanged ECM several times in order to reduce the time it takes for a receiver to access the service. (To access a service, the receiver must first acquire the corresponding ECM.) A filter may be included in the receiver for the purpose of filtering out second and further occurrences of the same decryption key.

For such schemes to work, the receiver needs to obtain secure access to the authorization key. In the prior art system of FIG. 2, each device is associated with one fixed device key, usually incorporated in a smart card. The transmitter has access to all fixed device keys. For each device, the transmitter retrieves its associated fixed device key and uses an encryptor 230 to encrypt the authorization key under control of the fixed device key. The encrypted authorization key is then transmitted to only the associated receiver, using a so-called Entitlement Management Message (EMM). The receiver includes a decryptor 260. The decryptor 260 is used under control of the fixed device key to decrypt the received encrypted authorization key. The retrieved authorization key is then used to control the decryptor 250.

FIG. 3 shows the mechanism for distributing the authorization key according to the invention. The transmitter 100 includes a storage 280 in which it stores a plurality of unique device keys. In a system for use with possibly millions of receivers, typically $2^{16}$ different device keys may be used. The encryptor 270 is used to encrypt the authorization key. Each of the device keys is used in turn to once encrypt the plain form of the authorization key. If $2^{16}$ different device keys are used this results also in $2^{16}$ different encrypted representations of the authorization key. These encrypted representation form a so-called key block (KB). As will be clear, each entry in the key block corresponds to one device key. The key block is transmitted by the transmitter 100 to all receivers, preferably via a broadcast, using an EMM. Each receiver is provided with a subset of at least two of the device keys. It will be appreciated that normally the subset will be small compared to the entire set of device keys. The subset of device keys may be provided to the receiver in the form of a secure smart card. The receiver uses a decryptor 272 and its subset of device keys to retrieve the authorization key from the key block. As described each device key corresponds to an entry in the key block. The receiver knows this correspondence. As an example, the receiver may be supplied, for each of its device keys, with an identification of the corresponding entry in the key block. For example, using a key block with $2^{16}$ entries, a 16-bit entry number may be given for each device key to indicate the entry in the key block encrypted using that device key. Preferably, the key block is structured to make the correspondence easier to determine. For instance, in a system with a key block with $2^{16}$ entries en 16 device keys for each receiver, the device keys are preferably arranged in a matrix form with 16 columns and 4096 rows. Each device gets one device key from each column. The first device key from column 1, the second from column 2, etc. In this way only a 12 bit row number needs to be given for each device key. It will be understood that in most situations it will be sufficient to transmit only a small part of the key block. It is sufficient to provide each entitled receiver to one entry associated with one of its keys. Assuming that all device keys are used by at least one receiver, and using the described matrix structure it is sufficient to only transmit one column. It will also be appreciated that an entry of the key block does not need to contain the authorization key itself encrypted using the associated device key. Instead it may contain information, like pointers, which aid in retrieving the authorization key. In this way further levels of sharing may be achieved. To increase security, it may also be required to use more than one device key to retrieve the authorization key (e.g. the authorization key is encrypted twice). Preferably each receiver is associated with a set of device keys which is unique for that receiver (although the individual keys are shared).

If at a certain moment inadvertently an authorization key has been illegally obtained, a new key block can be sent to all receivers. If it is known which receiver has been used to obtain the authorization key, this receiver can be revoked. Revocation occurs by putting an invalid value in all entries of the key block corresponding to any one of the device keys of the receiver to be revoked. An invalid value means any value other than the new authorization key encrypted under control of the device key corresponding to that entry of the key block. Preferably, a predetermined invalid value is used. This allows a receiver to determine that decryption of an entry of the key block did not produce a valid authorization key. A non-revoked receiver can then try another one of its device keys in order to obtain the authorization key.

Preferably, devices can be temporarily disabled (revoked) to provide conditional services (instead of permanently disabling a receiver). To this end, the entire set of device keys is arranged in subsets, each of which corresponds to a respective, different service. A receiver authorized for providing access to a service is supplied with at least one device key for that service. If desired, some device keys may provide access to more than one service. Whenever a data broadcast takes place for that service, first a key block is transmitted which only contains valid entries for device keys corresponding to that service.

In a preferred embodiment, it is possible to update the subset of device keys associated with a receiver. To this end, each receiver is associated with a fixed device key, e.g. supplied to the receiver using a smart card. The transmitter 100 also has access to those fixed device keys. For a specific receiver, the transmitter retrieves the fixed device keys. It then creates a new subset of device keys from the entire set stored in storage 280. Preferably the new set is unique and does not contain revoked device keys. The transmitter then uses an encryptor 290 to encrypt the new subset of device keys under control of the fixed device key. The outcome is transmitted to the specific receiver using an EMM. The receiver uses a decryptor 292 to decrypt the received encrypted subset under control of its fixed device key. It will be appreciated that the new set of keys may also be transferred using a portable storage medium, like a smart-card, CD, solid state memory card, etc.

It will be appreciated that for all described encryption/decryption processes suitable algorithms may be used. Many suitable algorithms are known (like using DES in CBC mode for encrypting the data stream) and are not part of the invention. It will also be appreciated that it is preferred to perform most of the functionality in a secure environment, like a tamper resistant smart card. Assuming that control words are regularly changed, actual decryption of the data using the decryptor 240 may take place in a less secure environment.

In itself the additional layer of protection provided by the control words is not required. In principle, the actual data can be encrypted and decrypted directly under control of the authorization key. Since the size of the key block will normally be considerably larger than the control word, for larger systems it will usually not be possible to update the authorization key as frequently as a control word is typically changed (e.g. once a second). For those systems, it may still be possible to remove the layer of the control words, as long as the actual data decryption also occurs under secure conditions. For smaller systems, it may be possible to change the authorization key frequently enough to make the layer of control words obsolete.

The invention claimed is:

1. A transmission system for providing conditional access to transmitted data; the system including a transmitter and a plurality of receivers coupled via a network;
   the transmitter including means for transmitting:
   to all receivers the same data encrypted under control of a same authorization key; and
   to all receivers a same key block with a plurality of entries, wherein each entry is associated with a respective different device key, at least some of the entries containing a representation of the authorization key encrypted with the associated device key, and each of the receivers being associated with a corresponding set of a plurality of device keys, wherein at least two of the receivers are associated with sets that comprise at least one corresponding device key, each of the receivers including:
  means for receiving the key block and the encrypted data;
  a first decryptor for retrieving the authorization key by taking a single one of the device keys from the corresponding set of a plurality of device keys associated with the receiver and decrypting at least one entry of the key block that is associated with the single one device key; and
  a second decryptor for decrypting the encrypted data under control of the authorization key, wherein the transmitter is operative to renew a set of device keys of a specific receiver by transmitting to the receiver a new set of device keys encrypted under control of a fixed device key that is unique for the receiver, and wherein the receiver is operative to receive a set of encrypted device keys, and the receiver includes a third decryptor for decrypting the set of encrypted device keys under control of a fixed device key that is unique for the receiver.

2. A transmission system as claimed in claim 1, wherein the set of device keys associated with each respective one of the receivers is unique for the receiver.

3. A transmission system as claimed in claim 1, wherein the transmitter is operative to disable decryption of the data in a receiver by changing the authorization key and transmitting a key block wherein entries associated with device keys which are associated with a receiver to be revoked contain values other than the representation of the authorization key encrypted with the associated device key.

4. A transmission system as claimed in claim 3, wherein the transmitter is operative to re-enable decryption of the data in a disabled receiver by changing the authorization key and transmitting a key block wherein at least one of the entries associated with device keys which are associated with a receiver to be re-enabled contains the representation of the authorization key encrypted with the associated device key.

5. A transmitter for use in a transmission system as claimed in claim 1, wherein the transmitter is coupled via the network to the plurality of receivers; the transmitter including the means for transmitting:
  to all receivers the same key block with the plurality of entries, where each entry is associated with a respective different device key, at least some of the entries containing a representation of the authorization key encrypted with the associated device key, enabling the receivers to retrieving the authorization key by decrypting at least one entry of the key block that is associated with one of the set of device keys associated with the receiver; and
  to all receivers same data encrypted under control of the same authorization key, enabling the receivers to retrieve the data by decrypting the data under control of the authorization key.

6. A receiver for use in a transmission system as claimed in claim 1, wherein the receiver is associated with the corresponding set of a plurality of device keys; the receiver including:
  means for receiving encrypted data which is the same for all receivers in the system and which is encrypted under control of the authorization key which is the same for all receivers in the system;
  means for receiving the key block which is the same for all receivers in the system; the key block including a plurality of entries, where each entry is associated with a respective different device key, at least some of the entries containing a representation of the authorization key encrypted with the associated device key,
  the first decryptor for retrieving the authorization key by decrypting at least one entry of the key block that is associated with one of the set of device keys associated with the receiver;
  the second decryptor for decrypting the data under control of the authorization key.

7. A transmission system for providing conditional access to transmitted data including:
  a transmitter and a plurality of receivers coupled via a network;
  the transmitter configured to transmit a same data stream encrypted under control of a same authorization key to all receivers and to all receivers a same key block with a plurality of entries, wherein each entry is associated with a different device key, at least one of the entries containing a representation of the authorization key encrypted with the associated device key, and
  each of the receivers being associated with a corresponding set of a plurality of device keys and being configured to receive the key block and the encrypted data, with a first decryptor for retrieving the authorization key by taking a single one of the device keys from the corresponding set of a plurality of device keys associated with the receiver and decrypting at least one entry of the key block that is associated with the single one device key and a second decryptor for decrypting the data under control of the authorization key,
  wherein the transmitter is operative to renew a set of device keys of a specific receiver by transmitting to the receiver a new set of device keys encrypted under control of a fixed device key that is unique for the receiver, and wherein the receiver is operative to receive a set of encrypted device keys, and the receiver includes a third decryptor for decrypting the set of encrypted device keys under control of a fixed device key that is unique for the receiver.

8. A transmission system as defined in claim 7, wherein the set of device keys associated with each respective one of the receivers is unique for the receiver.

9. A transmission system as defined claim 7, wherein the transmitter is operative to disable decryption of the data in a receiver by changing the authorization key and transmitting a key block wherein entries associated with device keys which are associated with a receiver to be revoked contain values other than the representation of the authorization key encrypted with the associated device key.

10. A transmission system as defined in claim 9, wherein the transmitter is operative to re-enable decryption of the data in a disabled receiver by changing the authorization key and transmitting a key block wherein at least one of the entries associated with device keys which are associated with a receiver to be re-enabled contains the representation of the authorization key encrypted with the associated device key.

11. A transmitter for use in a transmission system as defined claim 7, wherein the transmitter is coupled via the network to the plurality of receivers; the transmitter including the means for transmitting:
  to all receivers the same key block with a plurality of entries, wherein each entry is associated with a respective different device key and wherein each of the receivers is associated with a corresponding set of a plurality of device keys and wherein at least one of the device keys of the set corresponds to a device key of another receiver in the system, at least some of the entries containing a representation of the authorization key encrypted with the associated device key, enabling the receivers to retrieving the authorization key by taking a single one of the device keys from the corresponding set of a plurality of device keys associated with the receiver and decrypting at least one entry of the key block that is associated with the single one device key, and to all receivers same data encrypted under control of the same authorization key, enabling the receivers to retrieve the data by decrypting the data under control of the authorization key.

12. A receiver for use in a transmission system as defined claim 7, wherein the receiver is associated with the set of a plurality of device keys and wherein at least one of the device keys of the set corresponds to a device key of another receiver in the system, the receiver including:

means for receiving encrypted data which is the same for all receivers in the system and which is encrypted under control of the authorization key which is the same for all receivers in the system;

means for receiving the key block which is the same for all receivers in the system; the key block including a plurality of entries, where each entry is associated with a respective different device key, at least some of the entries containing a representation of the authorization key encrypted with the associated device key, the first decryptor for retrieving the authorization key taking a single one of the device keys from the corresponding set of a plurality of device keys associated with the receiver and decrypting at least one entry of the key block that is associated with the single one device key;

the second decryptor for decrypting the data under control of the authorization key.

13. A transmission system as defined claim 7, wherein the same key block corresponds to a subset of different device keys contained within the transmitter.

14. A transmission system as defined claim 7, wherein the receiver uses the first decryptor and the key block to retrieve the authorization key.

15. A transmission system as defined claim 1, wherein the same key block corresponds to a subset of different device keys contained within the transmitter.

16. A transmission system as defined claim 1, wherein the receiver uses the first decryptor and the key block to retrieve the authorization key.

17. A method for providing conditional access to transmitted data over a network including a transmitter and a plurality of receivers, each of said receivers being associated with a corresponding set of a plurality of device keys, said method comprising:

transmitting the same data to all receivers, wherein said same data is encrypted under control of a same authorization key;

transmitting to all receivers a same key block with a plurality of entries, where each entry is associated with a respective different device key, at least some of the entries containing a representation of the authorization key encrypted with the associated device key;

receiving at each receiver the key block and the encrypted data, wherein each receiver is associated with a set of a plurality of device keys and wherein at least one of the device keys of the set corresponds with a device key of a set associated with another receiver in the system;

retrieving the authorization key at one or more of said plurality of receivers by taking a single one of the device keys from the corresponding set of a plurality of device keys associated with the receiver and decrypting at least one entry of the key block that is associated with the single one device key;

decrypting the data at said one or more of said plurality of receivers under control of the authorization key, and transmitting to renew a set of device keys of a specific receiver by transmitting to the specific receiver a new set of device keys encrypted under control of a fixed device key that is unique for the specific receiver, and receiving at the specific receiver the set of encrypted device keys, and decrypting at a third decryptor of the specific receiver the set of encrypted device keys under control of a fixed device key that is unique for the specific receiver.

18. A method as claimed in claim 17, wherein the set of device keys associated with each respective one of the receivers is unique for the receiver.

19. The system of claim 1, wherein at least some device keys are shared between at least two of the receivers.

20. The system of claim 7, wherein at least some device keys are shared between at least two of the receivers.

21. A transmission system for providing conditional access to transmitted data; the system including a transmitter and a plurality of receivers coupled via a network;

the transmitter to transmit to all receivers the same data encrypted under control of a same authorization key; and the transmitter to transmit to all receivers a same key block with a plurality of entries, wherein each entry is associated with a respective different device key, at least some of the entries containing a representation of the authorization key encrypted with the associated device key, and each of the receivers being associated with a corresponding set of a plurality of device keys, wherein at least two of the receivers are associated with sets that comprise at least one corresponding device key, each of the receivers to receive the key block and the encrypted data and including:

a first decryptor for retrieving the authorization key by taking a single one of the device keys from the corresponding set of a plurality of device keys associated with the receiver and decrypting at least one entry of the key block that is associated with the single one device key; and a second decryptor for decrypting the encrypted data under control of the authorization key, wherein the transmitter is operative to renew a set of device keys of a specific receiver by transmitting to the receiver a new set of device keys encrypted under control of a fixed device key that is unique for the receiver, and wherein the receiver is operative to receive a set of encrypted device keys, and the receiver includes a third decryptor for decrypting the set of encrypted device keys under control of a fixed device key that is unique for the receiver.

* * * * *